US012784365B2

(12) United States Patent
Odding et al.

(10) Patent No.: US 12,784,365 B2
(45) Date of Patent: Nov. 3, 2026

(54) 3D MODEL PROCESSING SYSTEM AND METHOD AND STORAGE CIRCUIT FOR DATA COMPRESSION

(71) Applicant: Viverse Limited, Dublin (IE)

(72) Inventors: Aart Victor Odding, Dublin (IE); Teemu Petteri Typpi, Dublin (IE); Tuomo Matias Paavilainen, Dublin (IE)

(73) Assignee: Viverse Limited, Dublin (IE)

( * ) Notice: Subject to any disclaimer, the term of this patent is extended or adjusted under 35 U.S.C. 154(b) by 92 days.

(21) Appl. No.: 18/761,338

(22) Filed: Jul. 2, 2024

(65) Prior Publication Data

US 2025/0014282 A1 Jan. 9, 2025

Related U.S. Application Data

(60) Provisional application No. 63/524,704, filed on Jul. 3, 2023.

(51) Int. Cl.

| | |
|---|---|
| ***G06T 17/20*** | (2006.01) |
| ***G06F 3/01*** | (2006.01) |
| ***G06T 9/00*** | (2006.01) |

(52) U.S. Cl.

CPC .............. *G06T 17/20* (2013.01); *G06F 3/013* (2013.01); *G06T 9/001* (2013.01)

(58) Field of Classification Search

None

See application file for complete search history.

(56) References Cited

U.S. PATENT DOCUMENTS

| | | | | |
|---|---|---|---|---|
| 8,805,097 | B2 * | 8/2014 | Ahn | G06T 17/205 382/232 |
| 10,872,469 | B2 | 12/2020 | Li et al. | |
| 2003/0169267 | A1 * | 9/2003 | Lu | G06T 15/50 345/581 |
| 2005/0243086 | A1 | 11/2005 | Schechter et al. | |

(Continued)

FOREIGN PATENT DOCUMENTS

| | | | |
|---|---|---|---|
| CN | 101354788 | A | 1/2009 |
| CN | 102498673 | B | 11/2015 |

(Continued)

OTHER PUBLICATIONS

Topraj Gurung et al., "Zipper: A compact connectivity data structure for triangle meshes", Computer-Aided Design, Feb. 2013, pp. 262-269, vol. 45, No. 2.

(Continued)

*Primary Examiner* — Joni Hsu

(74) *Attorney, Agent, or Firm* — JCIPRNET

(57) ABSTRACT

This disclosure provides a 3D model processing system. The 3D model processing system includes a storage circuit and a processor. The storage circuit is configured to store a program code. The processor is coupled to the storage circuit and configured to access the program code to execute: obtaining a first original spatial value and a second original spatial value of a 3D model; obtaining a difference value between the first original spatial value and the second original spatial value; and generating a compressed spatial value corresponding to the second original spatial value based on the difference value.

14 Claims, 13 Drawing Sheets

900

(56) References Cited

U.S. PATENT DOCUMENTS

| | | | | |
|---|---|---|---|---|
| 2010/0245936 | A1* | 9/2010 | Yoshizawa | H04N 1/4076 358/461 |
| 2012/0229464 | A1 | 9/2012 | Fishwick | |
| 2018/0253867 | A1 | 9/2018 | Laroche et al. | |
| 2020/0388072 | A1 | 12/2020 | Bell et al. | |
| 2023/0097562 | A1* | 3/2023 | Shkurko | G06T 15/06 345/418 |
| 2023/0306661 | A1* | 9/2023 | Stepuch | G06T 11/40 |
| 2024/0242391 | A1* | 7/2024 | Zakharchenko | H04N 19/46 |
| 2025/0200814 | A1* | 6/2025 | Kim | H04N 19/20 |

FOREIGN PATENT DOCUMENTS

| | | | |
|---|---|---|---|
| CN | 112000406 | A | 11/2020 |
| CN | 115713583 | A | 2/2023 |
| CN | 116368526 | A | 6/2023 |
| EP | 3580726 | | 6/2021 |
| JP | 2002008060 | | 1/2002 |
| JP | 2009193095 | | 8/2009 |
| JP | 2019149674 | | 9/2019 |
| JP | 2020160737 | | 10/2020 |
| JP | 2021508869 | | 3/2021 |
| JP | 2022041706 | | 3/2022 |
| TW | 200915118 | A | 4/2009 |
| WO | 2021262402 | | 12/2021 |

OTHER PUBLICATIONS

"Search Report of Europe Counterpart Application", issued on Nov. 14, 2024, p. 1-p. 5.

"Search Report of Europe Related Application, Application No. 24186029.5", issued on Nov. 29, 2024, p. 1-p. 5.

"Office Action of Japan Related Application, Application No. 2024-106539", issued on Jun. 3, 2025, p. 1-p. 5.

"Office Action of Japan Counterpart Application", issued on Jul. 8, 2025, p. 1-p. 10.

"Office Action of Taiwan counterpart Application", issued on Aug. 28, 2025, p. 1-p. 20.

"Office Action of Taiwan related Application, application No. 113124652", issued on Aug. 8, 2025, p. 1-p. 10.

"Office Action of United Arab Emirates Counterpart Application", issued on Feb. 10, 2026, p. 1-p. 8.

* cited by examiner

300B

300D

400

500

510

Unflattened Model Hierarchy

520

Flattened Model Hierarchy

800

1100

3D MODEL PROCESSING SYSTEM AND METHOD AND STORAGE CIRCUIT FOR DATA COMPRESSION

CROSS-REFERENCE TO RELATED APPLICATION

This application claims the priority benefit of U.S. provisional application Ser. No. 63/524,704, filed on Jul. 3, 2023. The entirety of the above-mentioned patent application is hereby incorporated by reference herein and made a part of this specification.

BACKGROUND

Technical Field

The disclosure relates to a 3D model processing system; particularly, the disclosure relates to a 3D model processing system, a 3D model processing method, and a storage circuit.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided to the user over the web.

SUMMARY

The disclosure is direct to a 3D model processing system, a 3D model processing method, and a storage circuit, so as to provide an efficient and low-latency manner to provide the content of the XR to the user.

In this disclosure, a 3D model processing system is provided. The 3D model processing system includes a storage circuit and a processor. The storage circuit is configured to store a program code. The processor is coupled to the storage circuit and configured to access the program code to execute: obtaining a first original spatial value and a second original spatial value of a 3D model; obtaining a difference value between the first original spatial value and the second original spatial value; and generating a compressed spatial value corresponding to the second original spatial value based on the difference value.

In this disclosure, a 3D model processing method is provided. The 3D model processing method includes: obtaining a first original spatial value and a second original spatial value of a 3D model; obtaining a difference value between the first original spatial value and the second original spatial value; and generating a compressed spatial value corresponding to the second original spatial value based on the difference value.

In this disclosure, a storage circuit is provided. The storage circuit is configured to store a program code and the program code is configured to cause a processor to execute: obtaining a first original spatial value and a second original spatial value of a 3D model; obtaining a difference value between the first original spatial value and the second original spatial value; and generating a compressed spatial value corresponding to the second original spatial value based on the difference value.

Based on the above, according to the 3D model processing system, the 3D model processing method, and the storage circuit, the 3D model may be provided to the user in an efficient and low-latency manner.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
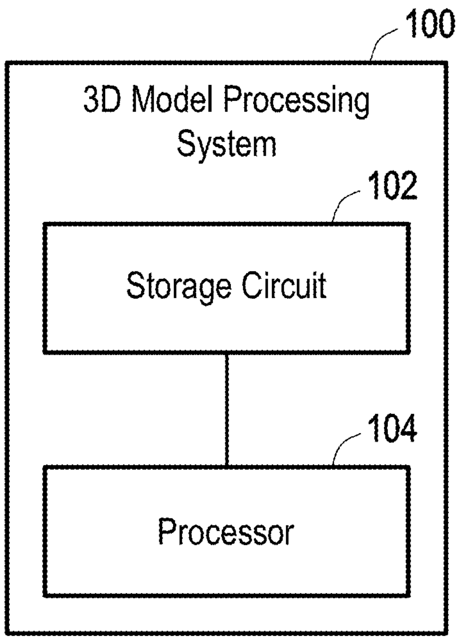
FIG. 1 is a schematic diagram of a 3D model processing system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided to the user over the web.

While contents (such as 3D geometry data) of the XR are streaming to the user over the internet, it is important that the user does not need to wait a long time before being placed in a virtual world. Therefore, at the stage of creating the contents of the XR, the size and the composition of the contents of the XR matters.

Further, when sending contents (such as 3D geometry data) of the XR over the web, it is important that the meshes, which comprise a set of triangles, of the contents of the XR are stored in as fewer bytes as possible to make the data transfer faster. Simultaneously, it is important that the decoding of the data must be performant enough to not create a noticeable delay for the user when the system is fetching the data.

Furthermore, while the user is viewing the content of the XR through a user device (e.g., computer, smartphone . . . etc.), the traditional methods of loading virtual worlds over the network by the user device often load all the data at once at startup (which causes long loading times), or load in data when a user representative object (e.g., avatar) of the user goes nearby a virtual object (virtual objects appearing and disappearing in the scene). Therefore, the user experience may be interrupted due to the waiting time of loading or latency of loading. In light of the above, it is the pursuit of people skilled in the art to provide an efficient and low-latency manner to provide the content of the XR to the user.

In order to provide the contents of the XR, such as a 3D model, to the user in an efficient and low-latency manner, three aspects related to the 3D model will be described below with the several embodiments. Firstly, how the 3D model is prepared, created, or partitioned. Secondly, how the 3D model is compressed. Thirdly, how the 3D model is loaded from a user end (e.g., the user device of the user). The three aspects may be used individually or together to provide the content of the XR to the user, and this disclosure is not limited thereto.

FIG. 1 is a schematic diagram of a 3D model processing system according to an embodiment of the disclosure. With reference to FIG. 1, a 3D model processing system 100 is depicted. In different embodiments, a 3D model processing system 100 may be implemented as various smart devices and/or computer devices, but is not limited thereto.

In FIG. 1, the 3D model processing system 100 includes a (non-transitory) storage circuit 102 and a processor 104. The storage circuit 102 is, for example, any type of fixed or removable random access memory (RAM), read-only memory (ROM), flash memory, hard disk, other similar devices, or a combination of these devices and may be used to record multiple program codes or modules.

The processor 104 is coupled to the storage circuit 102 and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuits, state machines, processors based on advanced RISC machine (ARM), and the like.

In an embodiment of the invention, the processor 104 may access the modules and program codes recorded in the storage circuit 102 to implement a 3D model processing proposed by the disclosure, and the details of which are described below.

Figure 2:
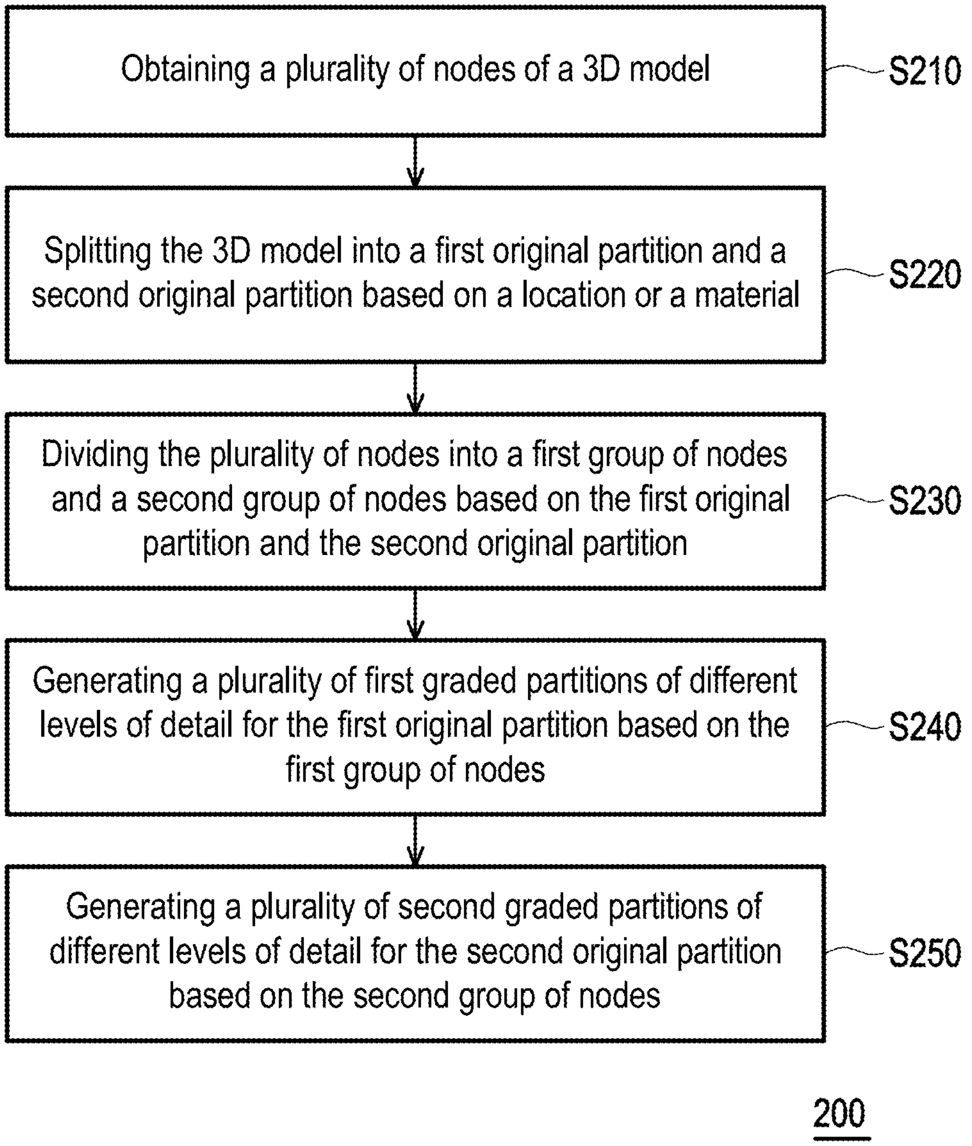
FIG. 2 is a schematic flowchart of a 3D model processing method according to an embodiment of the disclosure.

FIG. 2 is a schematic flowchart of a 3D model processing method according to an embodiment of the disclosure. With reference to FIG. 1 and FIG. 2, a 3D model processing method 200 of this embodiment may be executed by the 3D model processing system 100 in FIG. 1, and the details of each step in FIG. 2 will be described below with the components shown in FIG. 1.

First, in a step S210, a plurality of nodes of a 3D model may be obtained. In one embodiment, a node is a fundamental building block of the 3D model. That is, multiple nodes may form a geometry (e.g., a triangle) and multiple geometries may form the 3D model. Next, in a step S220, the 3D model may be split into a first original partition and a second original partition based on a location or a material. Further, the first original partition may include a first group of nodes and the second original partition may include a second group of nodes. That is, the 3D model may include multiple locations and multiple materials and the 3D model may be divided into multiple blocks (e.g., the first original partition, the second original partition . . . etc.) based on the location or material of each region of the 3D model. Afterwards, in a step S230, the plurality of nodes may be divided into a first group of nodes and a second group of nodes based on the first original partition and the second original partition. It is worth mentioned that, the step S220 and the step S230 may be performed at the same time, while the step S220 may define a shape of a piece of the 3D model and the step S230 may define which nodes are belongs to the piece of the 3D model. However, this disclosure is not limited thereto. Further, in a step S240, a plurality of first graded partitions of different levels of detail for the first original partition may be generated based on the first group of nodes. Moreover, in a step S250, a plurality of second graded partitions of different levels of detail for the second original partition may be generated based on the second group of nodes.

It is noted that, while it is described for the sake of convenience in explanation that the 3D model includes the first original partition and the second original partition, the 3D model may include a plurality of original partitions. Further, a plurality of graded partitions may correspond to the plurality of original partitions. However, this disclosure is not limited thereto.

Based on the above, by partitioning the 3D model based on materials or locations, a size of each partition of the 3D model may be decreased. Therefore, based on the request from a user device of the user end, instead of loading the whole original model at once, only part of the original model may be loaded by demand, thereby decreasing the waiting time and increasing the user experience.

In addition, the implementation details of the 3D model processing system 100 and the 3D model processing method 200 may be referred to the descriptions of FIG. 3A to FIG. 6 as follows to obtain sufficient teachings, suggestions, and implementation embodiments. In some embodiments, functions of the 3D model processing system 100 and the 3D model processing method 200 may be executed by the processor 104, but this disclosure is not limited thereto.

Figure 3A:
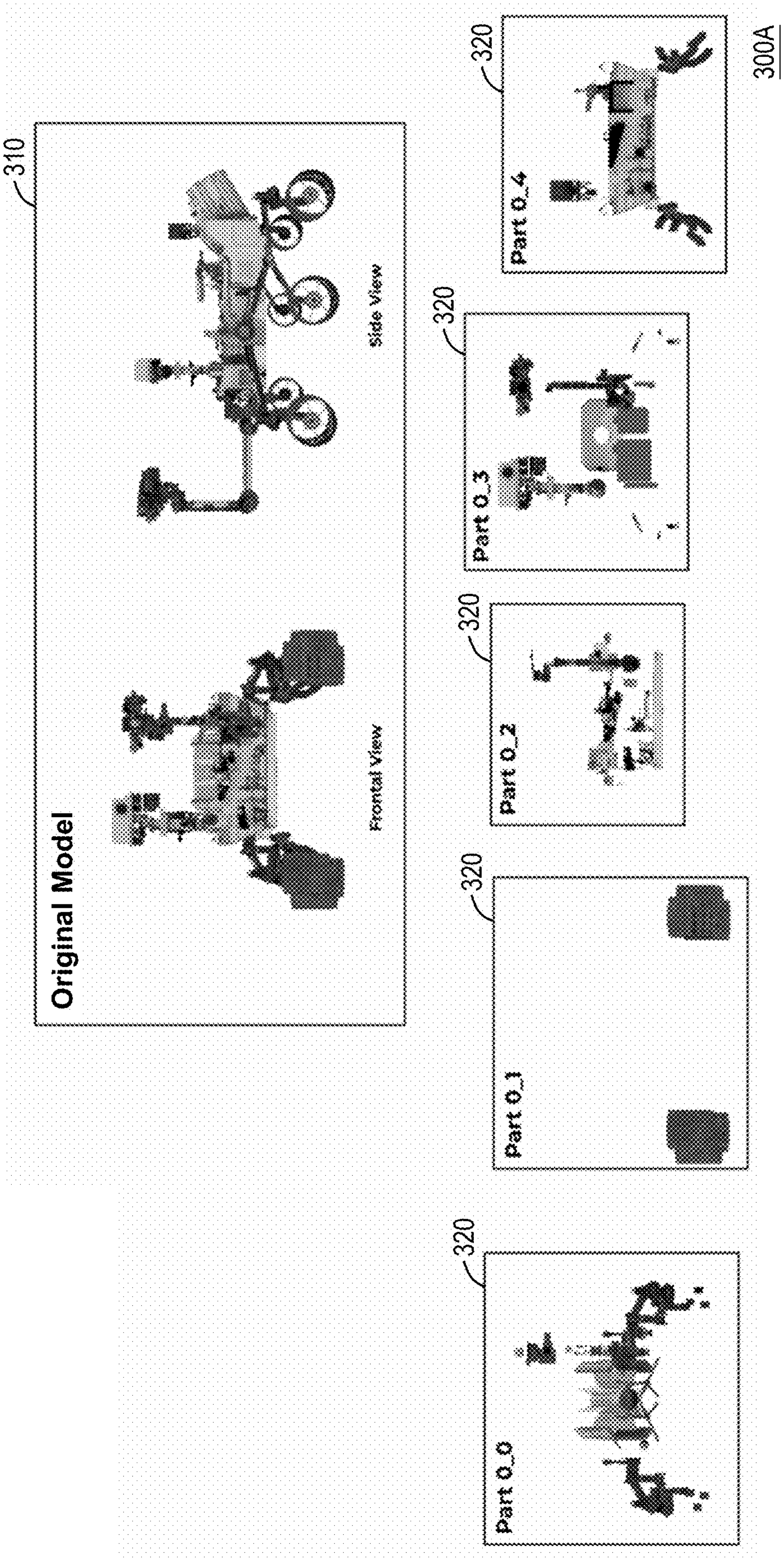
FIG. 3A is a schematic diagram of a partitioning scenario of a 3D model according to an embodiment of the disclosure.
Figure 3B:
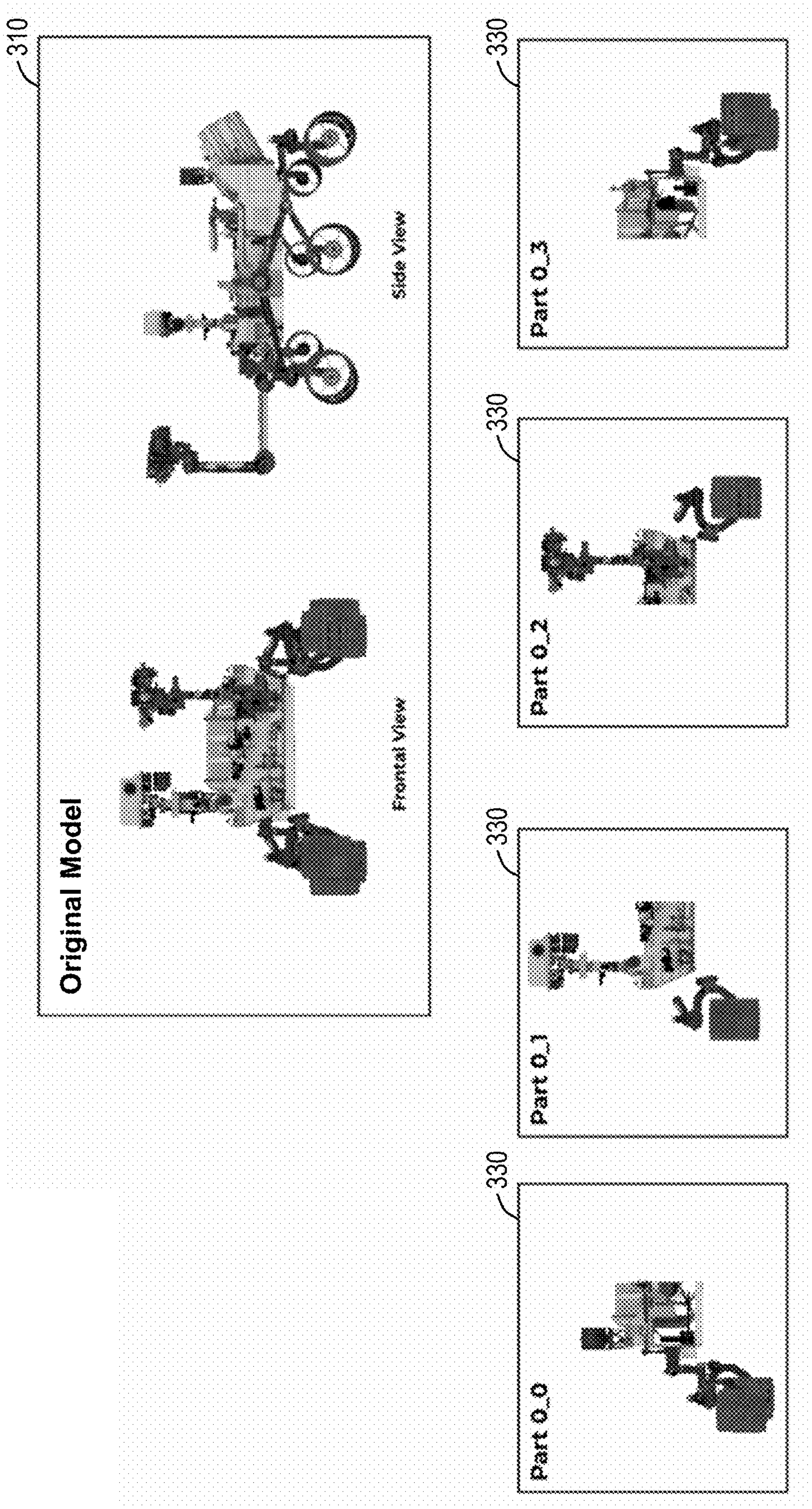
FIG. 3B is a schematic diagram of a partitioning scenario of a 3D model according to an embodiment of the disclosure.

FIG. 3A is a schematic diagram of a partitioning scenario of a 3D model according to an embodiment of the disclosure. FIG. 3B is another schematic diagram of a partitioning scenario of a 3D model according to an embodiment of the disclosure. With reference to FIG. 3A and FIG. 3B, a partitioning scenario 300A includes an original model 310 and a plurality of original partitions 320 and a partitioning scenario 300B includes an original model 310 and a plurality of original partitions 330.

In the stage of preparing a 3D model, how the 3D model being cut into pieces will affect not only the efficiency of streaming the 3D model over the internet, but also the speed of loading the 3D model at the used end. That is, in order to improve the speed and performance of loading and rendering 3D models, how the 3D model being cut into pieces matters. In one embodiment, the smaller pieces of the 3D model may be called as partitions.

Reference is first made to FIG. 3A. In one embodiment, a 3D model may be divided into smaller pieces (i.e., partition) based on a martial of each piece or each region of the 3D model. For example, the original model 310 of a robot may include different parts, for example, head, body, arms, wheels . . . etc. These parts may be designed to be composed of different materials, such as, metal, plastic, robber . . . etc. The original model 310 of the robot may be categorized into different materials and be divided into pieces based on the materials (e.g., a material index of each piece) as shown in FIG. 3A. In one embodiment, a material index of each piece may be pre-defined according to design needs. For example, a piece of material with a material index being 1 may be metal. The material indices of all pieces may be associated with a UV map corresponding to the 3D model. However, this disclosure is not limited thereto. That is, partitions with the same material may be grouped together. In other words, the first original partition may belong to a first material and the second original partition may belong to a second material. A mode of a process of splitting the original model 310 into pieces based on a material of each piece may be called as a "material mode" and these divided pieces may be called as a plurality of original partitions 320.

Reference is now made to FIG. 3B. In one embodiment, a 3D model may be divided into smaller pieces based on a location of each piece of the 3D model. For example, the original model 310 of the robot may include an upper part, a lower, a left part, a right part, a front part, a rear part . . . etc. The original model 310 of the robot may be categorized into different locations or quadrants in space and be divided into pieces based on the locations as shown in FIG. 3B. That is, partitions close to each other may be grouped together. In other words, the first original partition may belong to a first location and the second original partition may belong to a second location. A mode of a process of splitting the original model 310 into pieces based on a location of each piece may be called as a "spatial mode" and these divided pieces may be called as a plurality of original partitions 330.

Figure 3C:
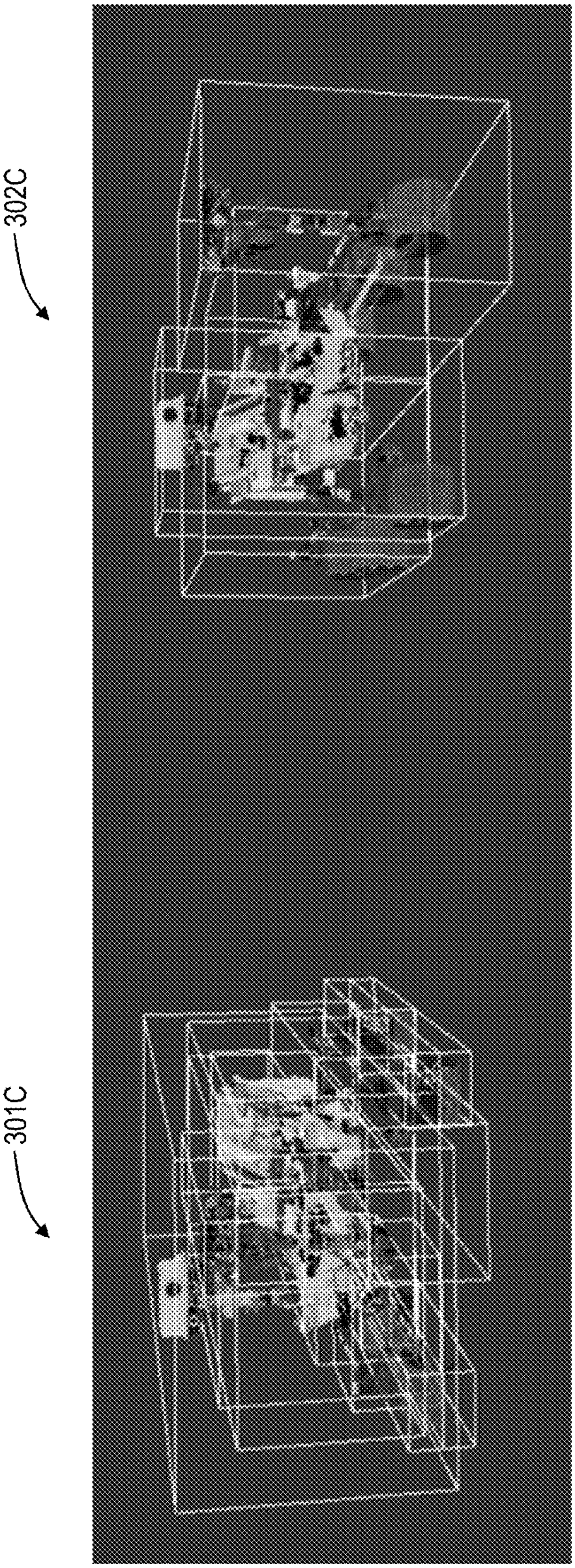
FIG. 3C is a schematic diagram of a partitioning scenario of a 3D model according to an embodiment of the disclosure.

FIG. 3C is a schematic diagram of a partitioning scenario of a 3D model according to an embodiment of the disclosure. With reference to FIG. 3C, a partitioning scenario 300C includes the partitioning scenario 301C and the partitioning scenario 302C. The partitioning scenario 301C depicts the original model 310 partitioned with the material mode and the partitioning scenario 302C depicts the original model 310 partitioned with the spatial mode.

In one embodiment, the original model 310 may be split into pieces using either the material mode to create the plurality of original partitions 320 or the spatial model to create the plurality of original partitions 330, but this disclosure is not limited thereto. That is, a mode of the partitioning may be firstly decided. Then, based on the mode of partitioning, the original model 310 may be split into a plurality of partitions. In one embodiment, a bounding box may represent a partition of the original model 310, but is not limited thereto. For example, as shown in FIG. 3C, each of the partitioning scenario 301C and the partitioning scenario 302C may include a plurality of bounding boxes and the plurality of bounding box may represent the plurality of original partitions 320 or the plurality of original partitions 330 respectively.

It is noted that, a larger partition may be split into smaller partitions. That is, the original model 310 may be split into smaller partitions so that parts of the original model 310 may be changed in visual quality independently of each other. The splitting process may be done with a recursive algorithm. That is, the splitting process may be performed repetitively until a specific conditions is met. Therefore, the original model 310 may be stored as independent triangles and it is possible to parse the original model 310 triangle by triangle without requiring having the whole original model 310 in memory at once. In one embodiment, the triangles may be referred to or stored as soup files, which may be files of collection of the independent triangles.

For example, after the mode of the partitioning has been decided and the partitioning has been performed, a bounding box of each partition may be split into multiple parts, and then creating new soup files for the triangles that fall into the new bounding boxes. This splitting process may be performed recursively. For example, on the first iteration of the splitting process, all the triangles of the plurality of original partitions 320 or the plurality of original partitions 330 may be split into two or more groups (also known as children).

Then, the splitting process may be performed again for these groups to creating two or more children for each group. This splitting process may be repeated until a specific conditions is met, for example, each of all children fall below a triangle threshold. The triangle threshold may be adjusted according to design needs. In one embodiment, the triangle threshold may be determined based on a maximum value of a computing power or a connection speed of the user device. That is, after a last iteration of the splitting process, a number of tringles in each group of triangles is less than the triangle threshold. After the splitting process, the partitions that have been created together may form a tree of or a hierarchy of the original model 310. That is, instead of loading the 3D model all at once, the 3D model may be loaded partition by partition. In this manner, by partitioning the 3D model based on materials or locations, a size of each partition of the 3D model may be decreased. Therefore, based on the request from a user device, instead of loading the whole original model 310 at once, only part of the original model 310 may be loaded by demand, thereby decreasing the waiting time and increasing the user experience.

Figure 3D:
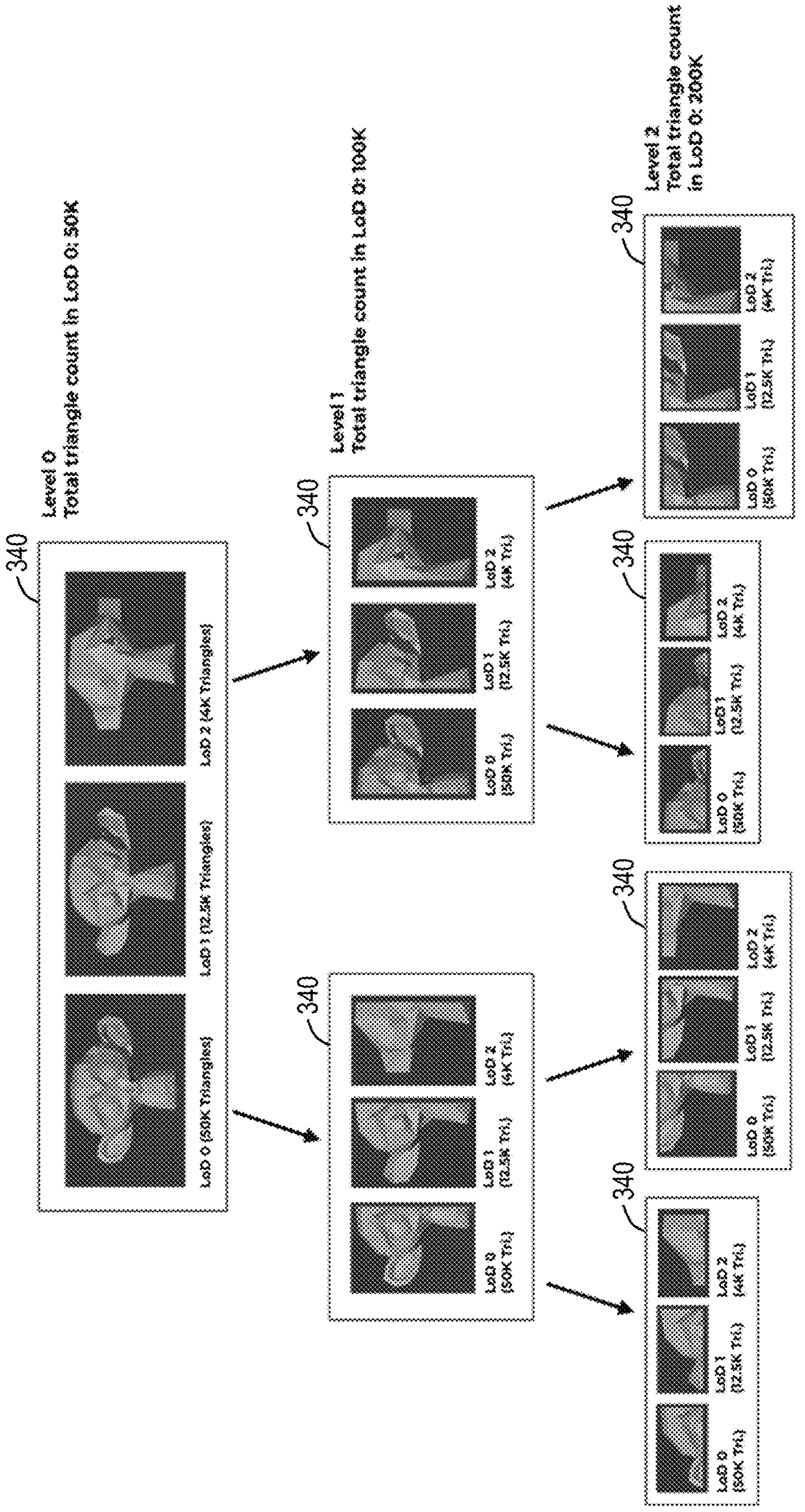
FIG. 3D is a schematic diagram of a partitioning scenario of a 3D model according to an embodiment of the disclosure.

FIG. 3D is a schematic diagram of a partitioning scenario of a 3D model according to an embodiment of the disclosure. With reference to FIG. 3D, a partitioning scenario 300D includes graded partitions 340.

In one embodiment, after the partitioning of the original model 310, the original model 310 may be split into pieces, for example, the original partitions 320 or the original partitions 330. That is, while the original model 310 is loaded by a user device, the original model 310 may be loaded partition by partition and a size of each partition may be determined based on a computer power of the used end. However, under certain circumstances, instead of loading a 3D model partition by partition, the 3D model may be needed to be loaded all at once. That is, a total number of triangles of the original model 310 needs to be smaller than a triangle threshold for the user device to process all the triangles at once. For example, the triangle threshold may be determined based on a maximum value of a computing power of the user device. In one embodiment, a decimation algorithm (chosen from existing technologies according to design needs) may be used to remove triangles, until the total number of triangles is less than the triangle threshold.

At the same time, while the user is viewing a part of the 3D model instead of the whole 3D model, the part of 3D model should provide an optimal visual experience to the user. That is, while the user is viewing a part (e.g., a partition) of the original model 310 instead of the whole model, a number of the triangles of the part should also meet the triangle threshold. In other words, some triangles containing key features (e.g., visually distinctive features) may be put back to the part to increase the number of triangles of the part for providing the optimal visual experience.

Meanwhile, while the user is viewing a portion of the part of the 3D model, the portion of the part should also provide an optimal visual experience to the user. That is, while the user is viewing a portion of the part (e.g., a portion of a partition) of the original model 310, a number of the triangles of the portion should also meet the triangle threshold. Similarly, some triangles containing key features may be put back to the portion to increase the number of triangles of the portion for providing the optimal visual experience. In one embodiment, the partition or the portion of the partition may be defined by a partitioning process of the original model 310 under the material mode or the spatial mode. However, this disclosure is not limited thereto.

To sum up, the original model 310 may include a plurality of partitions (e.g., the original partitions 320 or the original partitions 330) and each partition may be processed to include different amounts of triangles for different displaying situations to provide the optimal visual experience. That is, each partition may be processed to generate a plurality of graded partitions for displaying individually. Each of the graded partitions may belong to a level of partitioning. That is, each partition of the original model 310 may belong to different levels of partitioning of the graded partitions.

In one embodiment, the each partition may include 3 levels of partitioning, such as level 0, level 1, and level 2. A level of partitioning may define that how many parts or groups that a 3D model or a partition of a 3D model may be divided into, while the higher level of partitioning stands for more groups. That is, while a level of partitioning is higher, more groups of triangles may be included in a partition of the original model 310. For example, as shown in FIG. 3D, for a level 0 partitioning, the triangles of a partition (e.g., a monkey head) of the original model 310 or the original model 310 may belong to a same group. To be more specific, a group of triangles may include 50,000 triangles and a total number of triangles of the partition or the original model 310 of the level 0 partitioning may be 50,000. Further, for a level 1 partitioning, the triangles of the partition or the original model 310 may belong to two groups for displaying individually. To be more specific, each group of triangles may include 50,000 triangles and a total number of triangles of the partition or the original model 310 of the level 1 partitioning may be 100,000. Furthermore, for a level 2 partitioning, the triangles of the partition or the original model 310 may belong to four groups for displaying individually. To be more specific, each group of triangles may include 50,000 triangles and a total number of triangles of the partition or the original model 310 of the level 2 partitioning may be 200,000. However, this disclosure is not limited thereto.

Now referring back to FIG. 3D again, in one embodiment, for each level of partitioning, different levels of detail (LoD) may be created. That is, each of the original partitions 320 or each of the original partitions 330 may include different LoDs. The purpose is to make sure that the triangles of each of the graded partition is smaller than different triangle thresholds. For example, for different kinds of user devices of the user end, a computing power of each of the user devices may be different. Therefore, different triangle thresholds may apply to different user devices. To generate different levels of detail for each of the graded partitions, a decimation algorithm (chosen from existing technologies according to design needs) may be used to remove triangles, until the triangle count is under a certain limit. This limit may be determined based on a computing power of a user device. In one embodiment, each level of the partitioning may include 3 levels of detail (LoD), such as LoD 0, LoD 1, and LoD 2. That is, the graded partitions may include at least level 0 of detail partitions, level 1 of detail partitions, and level 2 of detail partitions. The LoD may define how may triangles that each group of triangles should include, while the lower LoD stands for more triangles. That is, while a level of detail is lower, more triangles may be included in each group of triangles. In other words, while the level of detail is higher, a compression ratio is also higher.

For example, for the LoD 0, a triangle count limit may be 50,000. That is, a group of triangles may include 50,000 triangles. For the LoD 1, a triangle count limit may be 12,500. That is, a group of triangles may include 12,500 triangles. For the LoD 2, a triangle count limit may be 4,000.

That is, a group of triangles may include 4,000 triangles. The triangle count limit may be determined according to design needs or based on a computing power of a user device. However, this disclosure is not limited thereto. It is worth mentioned that, the group(s) (i.e., partition(s)) of each level of partitioning together may form the original model 310 or a partition of the original model 310. That is, the original model 310 or a partition of the original model 310 of the level 0 partitioning may include 50,000 triangles in LoD 0, the original model 310 or a partition of the original model 310 of the level 1 partitioning may include 100,000 triangles in LoD 0, and the original model 310 or a partition of the original model 310 of the level 2 partitioning may include 200,000 triangles in LoD 0.

It is noted that, one purpose of the different levels of detail is to provide options to the user while viewing the model, so that an ideal visual result is still provided to the user while some unimportant details are not fully presented. That is, each partition of the original model 310 may be rendered in a higher or lower quality while needed. For example, only the parts of the original model 310 that are close to the viewer may be rendered in higher detail, while other parts of the original model 310 that are further away may be rendered in lower detail. These different levels of details of each partition help to improve the performance of the rendering while the original model 310 may still provide an ideal visual result to the user, because it doesn't have to render all of the details in the 3D model all at once. In this manner, the 3D model processing system 100 or the 3D model processing method 200 may provide a powerful way to improve the speed and performance of loading and rendering 3D models.

Figure 4:
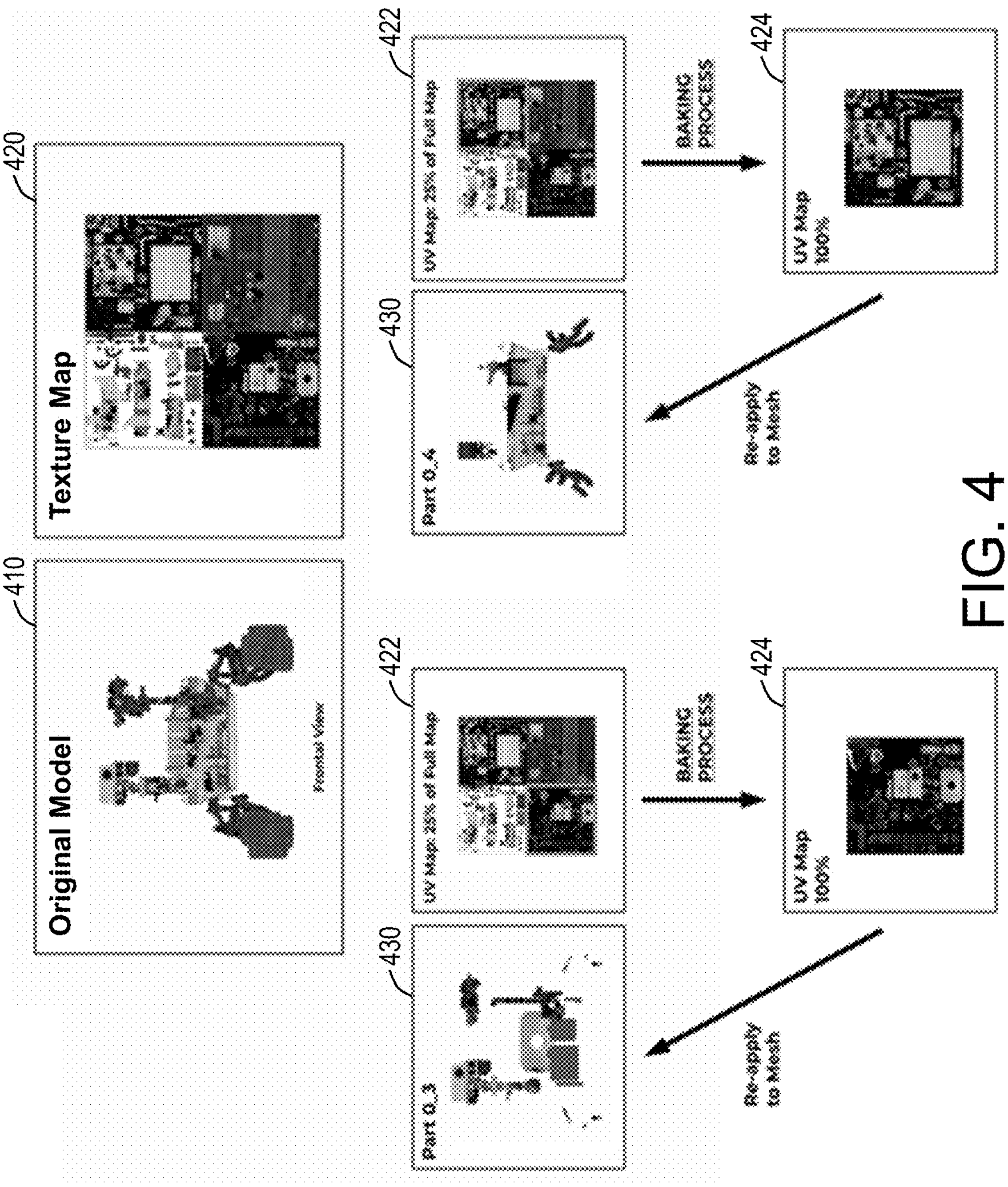
FIG. 4 is a schematic diagram of a baking scenario of a 3D model according to an embodiment of the disclosure.

FIG. 4 is a schematic diagram of a baking scenario of a 3D model according to an embodiment of the disclosure. With reference to FIG. 4, a baking scenario 400 depicts how textures apply to meshes (e.g., triangles) of a 3D model utilizing a baking process.

In one embodiment, if the partitions of a 3D model contain large textures, not only the meshes (e.g., triangles) may include several levels of detail, but also multiple levels of detail may be generated for the textures. For example, if a partition has a texture that has 2048 by 2048 pixels, the partition may be divided into more pieces, for example, four pieces. That is, four partitions might be created that each have 1024 by 1024 pixels. In this manner, instead of loading the whole textures of a partition at once, only part of the texture may be loaded according to the request from the user device, thereby decreasing the waiting time and increasing the user experience.

In one embodiment, a baking process is a process of transferring detailed information from a high-resolution 3D model to a lower-resolution 3D model. This is typically done to improve performance or reduce file size. The baking process involves creating texture maps that capture the details of the high-resolution model, such as lighting, shadows, and surface imperfections. These texture maps are then applied to the lower-resolution model, giving it the appearance of the high-resolution model without the computational cost of rendering all the polygons.

It is worth mentioned that, if the texture coordinates of texture maps for a 3D model are taking up too much space in the texture image, the texture coordinates may be recalculated and the textures may be re-baked as shown in FIG. 4. For example, textures of an original model 410 may be captured and stored as a plurality of texture maps 420 in a UV coordinate system. For example, as shown in FIG. 4, the original model 410 may correspond to four texture maps 420. The texture maps 420 may be compressed to generate a plurality of compressed texture maps 422. For example, as shown in FIG. 4, the four texture maps 420 may be compressed to one fourth of the original size to form the four compressed maps 422. Next, the baking process may be performed on each of the compressed texture maps to generate (bake out) a plurality of baked texture maps 424. Afterwards, each of the plurality of baked texture maps 424 may be applied to a corresponding mesh of the original model 410 to form a baked partition 430. That is, a 3D model may be unwrapped into a 2D plane (e.g., the texture map 420). Further, a baked texture may be created (baked out) by transferring a high-resolution model of a texture of the 3D model to a low-resolution model. In other words, the baked texture may contain key features (e.g., visually distinctive features) of the high-resolution model of the texture. Furthermore, the baked texture may be applied to a mesh of the 3D model. In this manner, the baking process may make the original model 410 more efficient to be stored and to be rendered.

In one embodiment, if the meshes may be stored more efficiently by baking the textures, the baking process may be performed to recalculate the texture coordinates and re-bake the textures. To determine if the texture coordinates are taking up too much space, a total area of the texture coordinates may be divided by a total area of the texture. If a result of the division is not below a certain threshold, then the texture coordinates may be recalculated and the textures may be re-baked. The threshold may be a value that is set by the user. The lower the threshold, the more likely it is that the texture coordinates will be recalculated.

Figure 5:
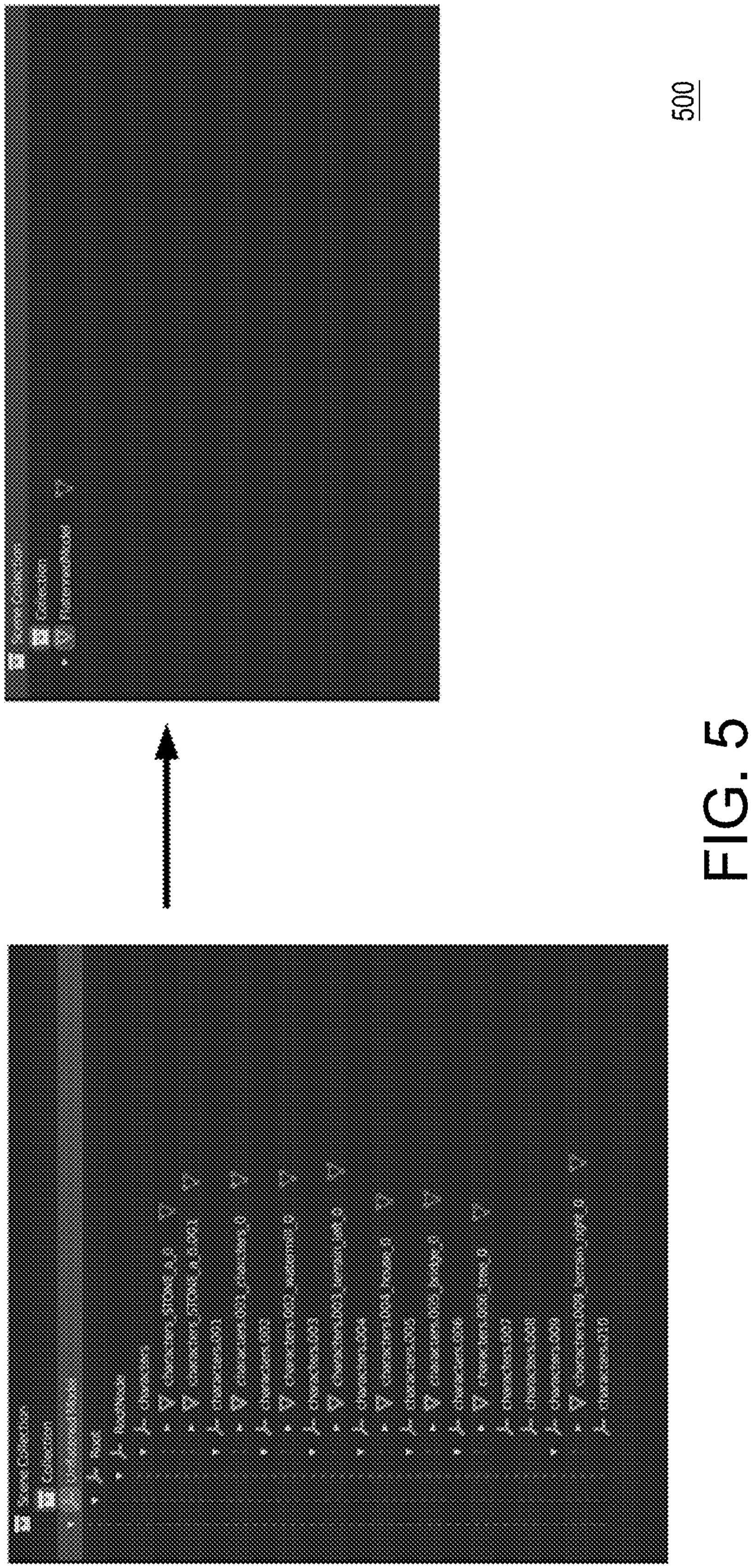
FIG. 5 is a schematic diagram of a flattening scenario of a 3D model according to an embodiment of the disclosure.

FIG. 5 is a schematic diagram of a flattening scenario of a 3D model according to an embodiment of the disclosure. With reference to FIG. 5, a flattening scenario 500 may include an unflattened model hierarchy 510 and a flattened model hierarch 520.

In one embodiment, 3D models may be made up of many different parts, called hierarchies. These hierarchies may be nested, so that one part may contain other parts. It is noted that, when a 3D model is flattened, all of the hierarchies are removed, and the 3D model is converted into a single, flat array of triangles. For example, by performing a flattening process, the unflattened model hierarchy 510 may become a flattened model hierarch 520 by removing all hierarchies in a structure of the 3D model and ensuring that only a flat array of triangles remains. This does not change the way the 3D model looks, but it does make it easier to process. That is, there is no visual change between an unflattened model corresponding to the unflattened model hierarchy 510 and a flattened model corresponding to the flattened model hierarchy 520. These files storing flat arrays of triangles may be referred to or stored as soup files, which may be files of collection of the independent triangles.

In one embodiment, each triangle in the flat array may store three pieces of information: the positions of the vertices that make up the triangle, the texture coordinates for the triangle, and the material index for the triangle. The texture coordinates may tell a renderer of a 3D model where to find the texture image that should be used to render the triangle. The material index may tell the renderer which material to use to render the triangle. It is worth mentioned that, storing all of the data for the 3D model in a flat array of triangles may make it easier to process, especially for large 3D models. This is because the renderer may quickly access the data it needs without having to traverse the hierarchies. In this manner, it is possible to process 3D models that are larger than the available amount of memory on the computer.

Figure 6:
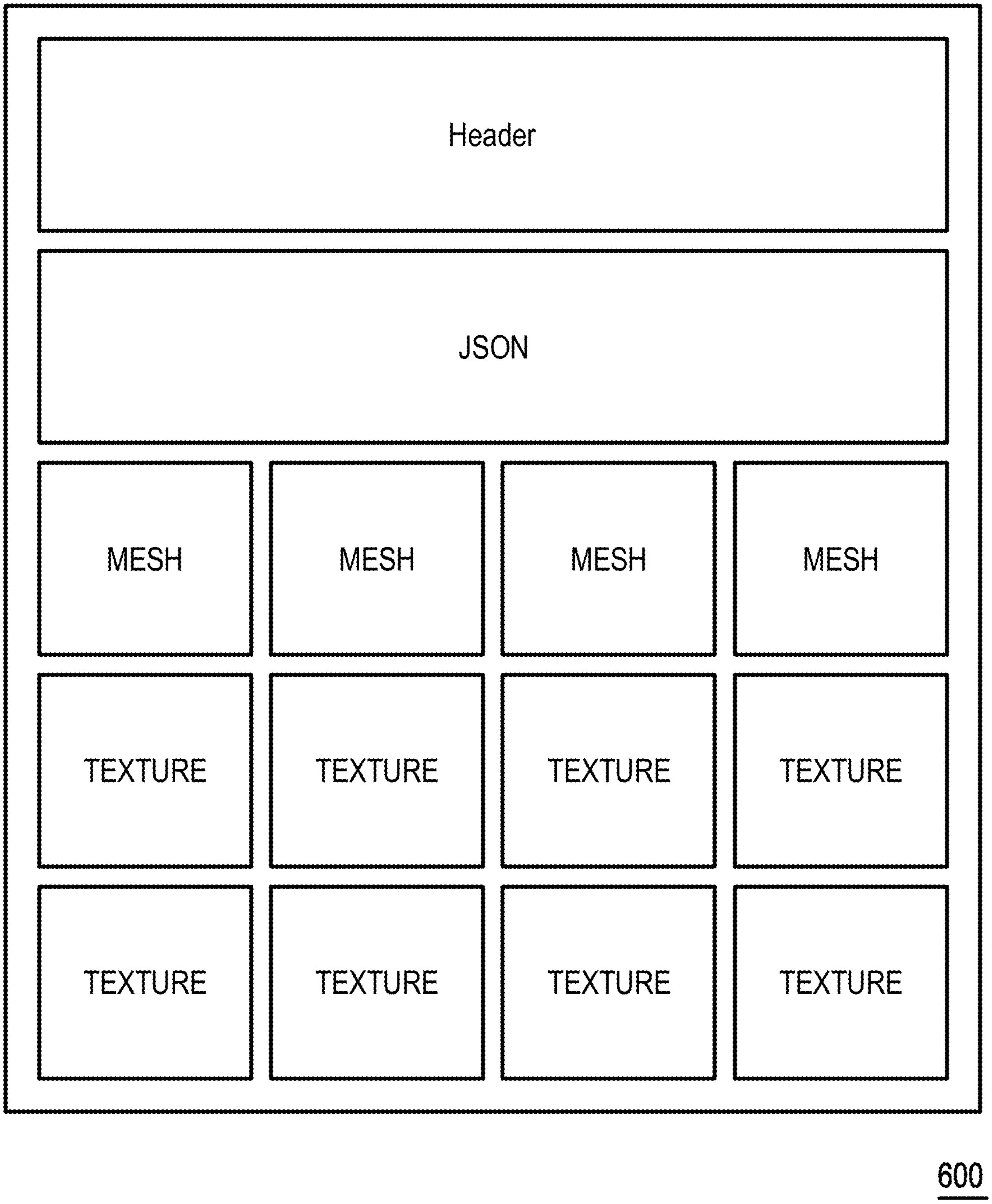
FIG. 6 is a schematic diagram of a file format of a 3D model process system according to an embodiment of the disclosure.

FIG. 6 is a schematic diagram of a file format of a 3D model process system according to an embodiment of the disclosure. With reference to FIG. 6, a file format 600 depicts an exemplary content of a 3D model, but this disclosure is not limited thereto.

In one embodiment, when all of the meshes and textures for all levels of detail have been generated, the meshes and the textures may be stored in the file format as shown in FIG. 6. The file format 600 may be an Extended Reality Geometry (XRG) file format or an Extended Reality Geometry Compressed (XRGC) file format. An XRG file or an XRGC file may be a data container that is used to store other files with common file types, such as JPG and PNG. However, this disclosure is not limited thereto.

In one embodiment, the file format 600 may include a header file, a JavaScript Object Notation (JSON) file, meshes (e.g., the triangles) of a 3D model, textures of the 3D model . . . etc. The header file may be configured to hold general information of files inside the container file. For example, the header file may describe some basic information and where the JSON file is located. Further, the JSON file may be configured to describe some basic information, such as a complete layout and hierarchy of the 3D model, and to describe where the JSON file is located. This JSON file may be used by a client application to read the model description and perform optimized queries for the geometry that it needs. The queries may be optimized based on different factors, such as a position of the user representative object of the user in the 3D space (e.g., the virtual world of XR) and a distance between the user representative object and the 3D model. It is worth mentioned that, the user representative object may be, for example, an avatar of the user, a virtual object to represent the user, a virtual object to represent a head-mounted display (HMD) device worn by the user, or other similar objects. However, this disclosure is not limited thereto. In this manner, based on the file format 600, data of the 3D model may be stored or compressed in an efficient way, so that it allows the data of the 3D model to be streaming by demand in real time, which is essential for XR applications, thereby increasing the user experience.

Figure 7:
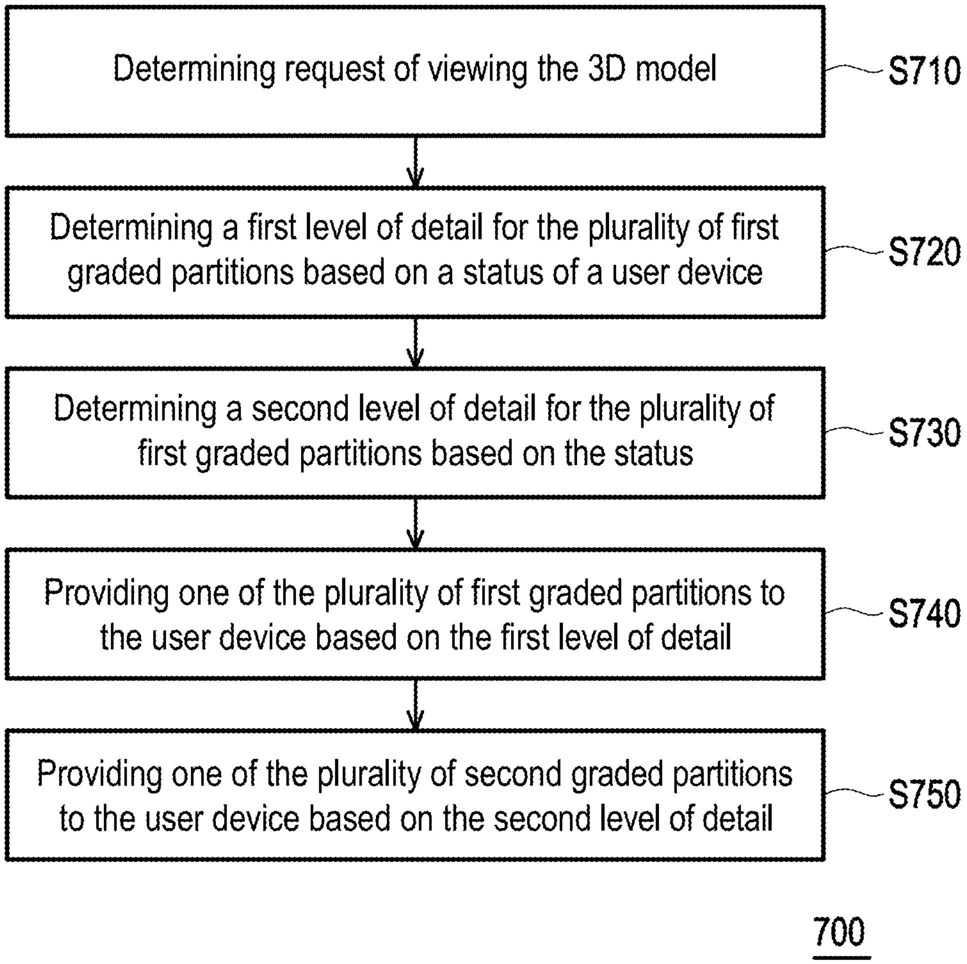
FIG. 7 is a schematic flowchart of a 3D model processing method according to an embodiment of the disclosure.

FIG. 7 is a schematic flowchart of a 3D model processing method according to an embodiment of the disclosure. With reference to FIG. 1 and FIG. 7, a 3D model processing method 700 of this embodiment may be executed by the 3D model processing system 100 in FIG. 1, and the details of each step in FIG. 7 will be described below with the components shown in FIG. 1.

First, in a step S710, a request of viewing the 3D model from a user device may be determined. For example, the user may want to view the 3D model in a virtual world while a user representative object of the user is at a distance from the 3D model in the virtual world. Further, the 3D model may be divided into two parts, a first part close to the user representative object and a second part relatively far from the avatar. Furthermore, the first part may belong to a first original partition and the second part may belong to a second original partition. Moreover, as shown in FIG. 3D, a plurality of first graded partitions of different LoD may be generated for the first original partition and a plurality of second graded partitions of different LoD may be generated for the second original partition. Next, in a step S720, a first level of detail for the plurality of first graded partitions may be determined based on a status of a user device of the user. For example, since the first part is closer to the user representative object (compared to the second part), the first LoD may be determined as LoD 0 to provide more details to the user device. Afterwards, in a step S730, a second level of detail for the plurality of second graded partitions may be determined based on the status of the user device. For example, since second part is farther to the user representative object (compared to the first part), the second LoD may be determined as LoD 2 to provide less details to the user device. Further, in a step S740, one of the plurality of first graded partitions may be provided to the user device based on the first level of detail. For example, while a computer power of a user device is higher, a graded partition of level 2 partitioning of the plurality of first graded partitions may be provided to the user device. On the other hand, while the computer power is lower, a graded partition of level 0 partitioning of the plurality of first graded partitions may be provided to the user device. Moreover, in a step S750, one of the plurality of second graded partitions may be provided to the user device based on the second level of detail. For example, while the computer power of a user device is higher, a graded partition of level 2 partitioning of the plurality of second graded partitions may be provided to the user device. On the other hand, while the computer power is lower, a graded partition of level 0 partitioning of the plurality of second graded partitions may be provided to the user device. However, this disclosure is not limited thereto.

Based on the above, based on the status of the user device, a proper level of detail is determined and corresponding content of the 3D model is provide to the user device in a low-latency manner.

In addition, the implementation details of the 3D model processing system 100 and the 3D model processing method 700 may be referred to the descriptions of FIG. 8 as follows to obtain sufficient teachings, suggestions, and implementation embodiments. In some embodiments, functions of the 3D model processing system 100 and the 3D model processing method 700 may be executed by the processor 104, but this disclosure is not limited thereto.

Figure 8:
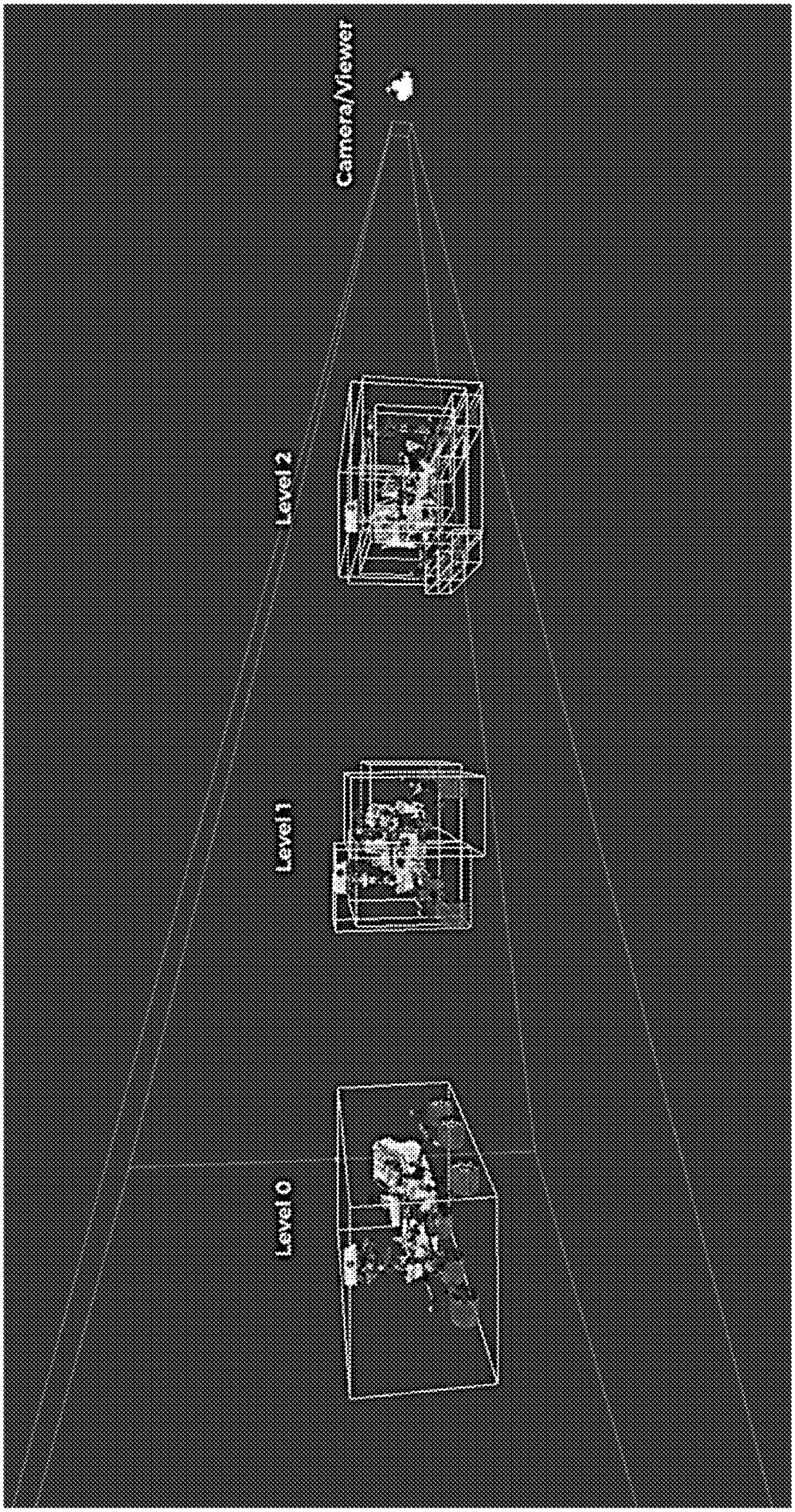
FIG. 8 is a schematic diagram of a viewing scenario of a 3D model according to an embodiment of the disclosure.

FIG. 8 is a schematic diagram of a viewing scenario of a 3D model according to an embodiment of the disclosure. With reference to FIG. 8, a viewing scenario 800 depicts how a 3D model may be loaded according to a status of the user device.

In one embodiment, during the stage of creating the model, the 3D model is divided into partitions and the partitions may be stored in different levels of detail. After that, while a user is viewing the 3D model, the 3D model may be rendered based on a status of the user device, such as a distance between the user representative object and the 3D model, an eye sight of the user, an eye gaze of the user, a (internet) connection speed of the user device, a computing power of the user device . . . etc. For example, the parts of the 3D model that are close to the user representative object may be rendered in higher detail, while the parts that are farther away from the user representative object may be rendered in lower detail. These different levels of details of each partition help to improve the performance of the rendering while the 3D model may still provide an ideal visual result to the user, because it doesn't have to render all of the detail in the 3D model all at once. That is, similar to how the user feel in the real world, one thing closer to the user may be more clear and another thing not that close to the user may be more vague. Therefore, the computing power for rendering a farther part of the 3D model may be saved, thereby improving the performance of the rendering the 3D model.

To sum up, a client-side logic algorithm may be considered based on a position of the user representative object in the virtual world. To be more specific, the client-side logic algorithm may be configured to decide which partitions at what level of detail would provide to the user device to give the best visual result. The client-side logic algorithm may be continuously updated in real time as the user representative object walks around the virtual world and the position or the view (i.e., eye sight or eye gaze) of the user changes accordingly. Further, an eye sight of the user may be represented as a field of view (FOV) of a camera or a viewer in the virtual world.

Furthermore, in some embodiments, a part of the 3D model is in the FOV or close to the FOV may be defined as a visible partition of the 3D model while other part of the 3D model may be defined as an invisible partition of the 3D model. Only while a partition of the 3D model is becoming a visible partition, the partition of the 3D model may be provided to the user device. However, this disclosure is not limited thereto.

Specifically, When the user device wants to start showing (i.e., viewing) a 3D model, the user device may first download metadata about the 3D model. This metadata may include a layout of the virtual world and a hierarchy of the nodes in the 3D model. The structure of the 3D model may be then replicated in memory as a tree of nodes. Each node in the tree may contain one or more levels of detail. Based on the tree of nodes and the status of the user device, the client-side logic algorithm is then used to find an optimal tree of nodes to make visible. The algorithm may take into account the user representative object's position and view to determine which nodes need to be visible in order to provide the best visual experience.

It is noted that, in prior methods, there may be a 3D model at multiple levels of detail. However, for each time representing different levels of details, a mesh is always loaded from the whole 3D model, but only less triangles are used to represent it. In this disclosure, the 3D model is split into a hierarchy, so elements in the hierarchy may be switched between levels of detail independently from each other. That is, for each time representing different levels of details, a mesh may be loaded from part of the whole 3D model instead of the whole 3D model. For example, as described in the 3D model processing method 200 of FIG. 2, the 3D model may include a first original partition and a second original partition and a plurality of first graded partitions and a plurality of second graded partitions may be generated based on the first original partition and the second original partition. Further, as described in the 3D model processing method 700 of FIG. 7, a status of the user device may be used to determine a level of detail of a first graded partition and a level of detail of a second graded partition. That is, instead of loading the whole 3D model at once, only part of the 3D model may be loaded by the user device, thereby decreasing the waiting time and increasing the user experience.

In addition, there are multiple strategies that may be used by the algorithm to find the optimal tree of nodes for displaying the 3D model. One strategy is to determine the level of detail of each partition or make visible the nodes based on a threshold value of the distance from the user representative object to the partition. Another strategy is to start from a root node of the lowest level of detail to make visible the nodes and gradually improve the tree of nodes.

In one embodiment, the threshold value of distance strategy may calculate the size of the partition in the view of the user device and try to provide the partition to the user device with a highest detail. If the size of the partition is larger than a certain threshold, then the 3D model processing system 100 may simplify the level of detail to make the size of the partition smaller. If the size of the partition is smaller than a certain threshold, then the system may refine the level of detail to make the size of the partition larger. That is, the 3D model processing system 100 may try to provide the 3D model as detailed (large) as possible as long as the computing power of the user device is enough. Besides, the view of the user device may include a distance between the user representative object and the 3D model or an angle at which the user looks at the 3D model, but this disclosure is not limited thereto. As shown in FIG. 8, if a partition is close to the user representative object, then the 3D model processing system 100 may render the partition in higher detail (e.g., LoD 0 of FIG. 3D), while a partition that is farther from the user representative object may be rendered in lower detail (e.g., LoD 2 of FIG. 3D). In other words, in the 3D model processing method 700, in response to a distance between the user representative object and the 3D model getting smaller, the first level of detail or the second level of detail may be upgraded (for example, from LoD 2 to LoD 0 of FIG. 3D) to provide more details of the 3D model. On the other hand, in response to a distance between the user representative object and the 3D model getting greater, the first level of detail or the second level of detail may be downgraded (for example, from LoD 0 to LoD 2 of FIG. 3D) to provide less details of the 3D model.

In one embodiment, the root node strategy may start with a root node in the lowest level of detail (e.g., LoD 2 of FIG. 3D) to provide the visual result to the user device. It is noted that, the more closer the partition of the 3D model to the root nodes, the higher visual discernibility (e.g., key feature) for the 3D model of the partition may be. The system then gradually improves the tree by replacing nodes for their children and improving the level of detail for nodes gradually. This strategy allows the system to respect a limitation on the amount of triangles that are loaded at one point in time. That is, compared with the 3D model processing method 700, instead of determining a level of detail of the partitions providing to the user device based on the status of the user device, the level of detail of the partitions providing to the user device may be started from the lowest level of detail. In other words, in response to a request of viewing the 3D model from the user device being determined, the lowest level of detail (e.g., LoD 2 of FIG. 3D) may be determined as the first level of detail of the first graded partitions and/or the second level of detail of the second graded partitions. Next, the lowest level of detail of the first graded partitions and/or the lowest level of detail of the second graded partitions may be provided to the user device based on the first level of detail and/or the second level of detail.

In one embodiment, the connection speed of the user device or the computing power of the user device may be used to determine a level of details of the partitions providing to the user device. That is, in response to a connection speed of the user device being greater than a speed threshold or a computing power of the user device being greater than a computing threshold, the first level of detail or the second level of detail may be upgraded to provide more details of the 3D model. On the other hand, in response to a connection speed of the user device being smaller than a speed threshold or a computing power of the user device being smaller than a computing threshold, the first level of detail or the second level of detail may be downgraded to provide less details of the 3D model.

Based on the above, at least one of these strategies may be used to determine when to refine or simplify the level of detail of a 3D model. It is noted that, the best strategy to use may depend on the specific application or according to the design needs, and this disclosure is not limited thereto. Therefore, by utilizing at least one of these strategies, a viewer logic (e.g., distance, eye sight, or eye gaze of a user) may be considered during the stage of viewing the 3D model to provide a better visual result to the user device in a low-latency manner.

Figure 9:
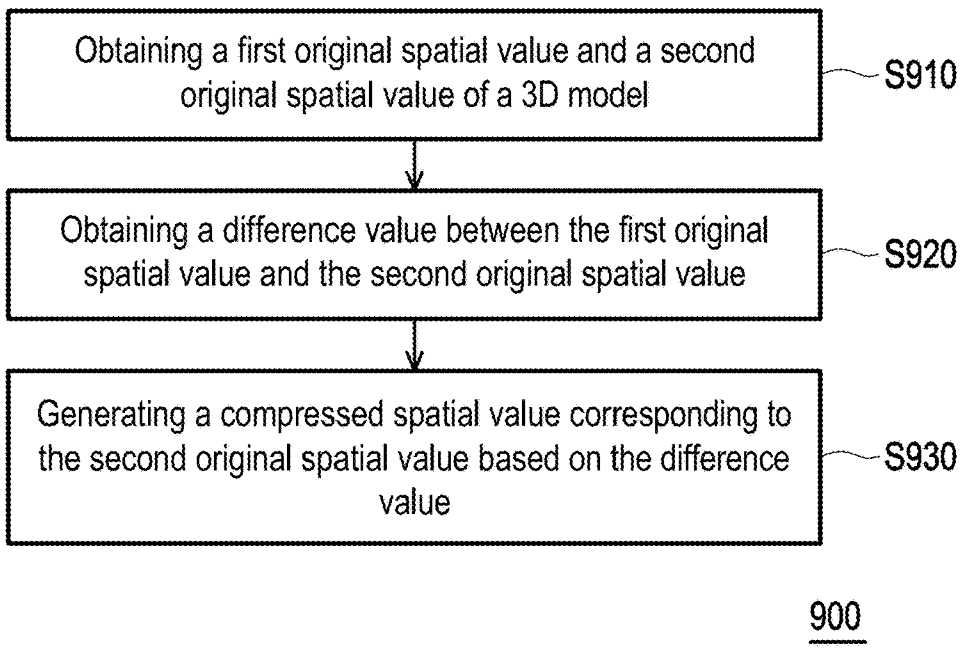
FIG. 9 is a schematic flowchart of a 3D model processing method according to an embodiment of the disclosure.

FIG. 9 is a schematic flowchart of a 3D model processing method according to an embodiment of the disclosure. With reference to FIG. 1 and FIG. 9, a 3D model processing method 900 of this embodiment may be executed by the 3D model processing system 100 in FIG. 1, and the details of each step in FIG. 9 will be described below with the components shown in FIG. 1.

First, in a step S910, a first original spatial value and a second original spatial value of a 3D model may be obtained. Next, in a step S920, a difference value between the first original spatial value and the second original spatial value may be obtained. Afterwards, in a step S930, a compressed spatial value corresponding to the second original spatial value based on the difference value may be generated.

Based on the above, data of the 3D model may be compressed in an efficient way, so that it allows the data of the 3D model to be streaming in real time, which is essential for XR applications, thereby increasing the user experience.

In addition, the implementation details of the 3D model processing system 100 and the 3D model processing method 900 may be referred to the descriptions of FIG. 10 to FIG. 11 as follows to obtain sufficient teachings, suggestions, and implementation embodiments. In some embodiments, functions of the 3D model processing system 100 and the 3D model processing method 900 may be executed by the processor 104, but this disclosure is not limited thereto.

Figure 10:
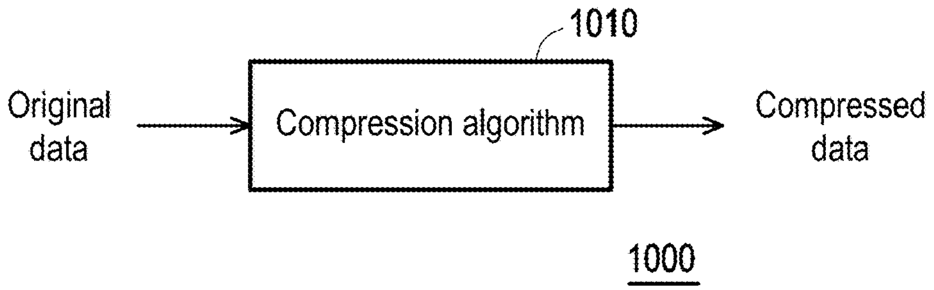
FIG. 10 is a schematic diagram of a compressing scenario of a 3D model according to an embodiment of the disclosure.

FIG. 10 is a schematic diagram of a compressing scenario of a 3D model according to an embodiment of the disclosure. With reference FIG. 10, a compressing scenario 1000 includes a compression algorithm 1010.

In one embodiment, after the partitions of the 3D model are generated, each partition may be compressed to decrease the size of data, thereby increasing the speed of transmission and loading. The compression may be specifically designed to be fast to decompress, so that the system may quickly load the partitions of the 3D model that are needed. For example, XRGC format is a compressed data format that is designed for streaming 3D models, which allows to create a good balance in decoding speed and file size. It is important to be able to decode XRGC data quickly, so that the 3D model may be rendered as quickly as possible. This is especially important for real-time applications, such as games and virtual reality.

Reference is now made to FIG. 10. The compression algorithm 1010 may be adopted to decrease the size of the data. That is, by performing the compression algorithm 1010 on an original data, a compressed data may be generated and the size of the compressed data may be smaller than the original data. The compression algorithm may include, for example, grouping triangles in a smart manner, baking the textures, flattening the hierarchy, compressing positional data (e.g., coordinates), compressing triangle data (e.g., vertex indices), compressing vectors . . . etc.

In one embodiment, a 3D model may include a plurality of spatial values, such as coordinates, vertex indices . . . etc. It is worth mentioned that, while the spatial values are points, such as coordinates of meshes, instead of storing the plurality of coordinates (e.g., data points) individually, the differences between consecutive coordinates may be stored. For example, a sequence of 2, 5, 4, 6, 8, may be stored by converting to a sequence of 2, 3, −1, 2, 2. That is, the relative value (i.e., difference/distance) between each coordinate may be stored instead of the absolute value of each coordinate. By using this strategy, compression ratio may be greatly improved. Further, the strategy may be applied to the 3D model processing method 900, while the second original spatial value may be a first coordinate of the 3D model and the second original spatial value may be a second coordinate of the 3D model. The first coordinate and the second coordinate may belong to a same mesh, but this disclosure is not limited thereto. That is, a compressed spatial value for the second original spatial value may be generated by replacing the second original spatial value with a difference value between the first original spatial value and the first original spatial value.

In another embodiment, while spatial values are vertex indices of triangles, instead of storing the plurality of vertex indices individually, no values or a specific value (e.g., 0) may be needed to be stored while the plurality of vertex indices belong to a continuous sequence. On the other hand, only when a next vertex index is not consecutive with a current vertex index, a value of the next vertex index may be needed to be stored. For example, a sequence of vertex indices V1, V2, V3, V4, V6 may be stored by converting to a sequence of 0, 0, 0, 0, V6. By using this strategy, the compression ratio may be greatly improved. Further, the strategy may be applied to the 3D model processing method 900, while the first original spatial value may be a first vertex index of a triangle of the 3D model and the second original spatial value may be a second vertex index of the triangle of the 3D model. That is, in response to the second vertex index being consecutive with the first vertex index, the compressed spatial value for the second original spatial value may be generated by replacing the second original spatial value with a specific value (e.g., 0).

Based on the above, no matter the spatial values are the coordinates of meshes or vertex indices of triangles, the spatial values may be compressed and a file size may be reduced. However, the compressing algorithm 1010 may not only include these strategies, but also include some other strategies, which will be described below.

In one embodiment, positional data (e.g., coordinate) may be usually stored as Cartesian coordinate. For example, a list of three values for each point: X, Y, and Z may be stored. The data would be laid out in an array like [{x, y, z}, {x, y, z}, {x, y, z}]. In one embodiment, each channel (e.g., X, Y, or Z) may be processed individually. In other words, there is a separate list for each channel. However, the resulting compressed streams might still be interleaved with each other.

In one embodiment, the positional data may include the vertex positions and texture coordinates. Vertex positions are the coordinates of the vertices in the 3D model. Texture coordinates are the coordinates of the texture pixels that are mapped to each vertex. It is noted that, triangle indices may be stored separately, while the triangle indices are the identification numbers for identify each triangle. For the compression of the positional data, there may be two steps: (1) storing the numbers as integers of N bits precision, and (2) compressing the sequence of integers.

To store the numbers as integers of N bits precision, in one embodiment, a sequence of numbers may be assumed, with a minimum value of MIN and a maximum value of MAX. The range of values of the number between MIN and MAX may be divided into $2^N$ points, where N is an integer indicating a number of bits of precision that is used. For each number in the sequence, the number may be stored as an index of the nearest discretized point. For example, while N is 11, the range of value between minimum value (MIN) and maximum value (MAX) of the sequence of numbers may be divided into 2048 points. That is, as shown in the following table, the MIN may be stored as 0 and the MAX may be stored as 2047. However, this disclosure is not limited thereto.

TABLE 1

| Original Number | 0 | 1000 | 2000 | 3000 | 4000 | 5000 | 6000 | 7000 | 8000 |
|---|---|---|---|---|---|---|---|---|---|
| Range | 0 (MIN)~2047 (MAX) [precision of $2^{11}$] | | | | | | | | |
| Compressed Number | 0 (MIN) | 255 | 511 | 767 | 1023 | 1279 | 1535 | 1791 | 2047 (MAX) |

It is noted that, storing the numbers this way means that some precision may be lost. For example, if the range of the original number is from 0 to 8000, the range including 8001 numbers may be represented by only 2048 discretized points (numbers). Therefore, if a number in the sequence is 4001, it may be stored as the index of the 1024th discretized point, even though it may be actually closer to the 1023rd discretized point. The amount of precision that is lost depends on the value of N. The higher the value of N, the more precision is retained. However, the higher the value of N, the more space is required to store the data. Therefore, it is important to choose the value of N depending on the quality requirements. If a quality requirement is high, a higher value of N may be used. On the other hand, if the quality requirement is not that high, a lower value of N may be used to save space.

To compress the sequence of integers, there may be three steps: (1) storing the number uncompressed in full precision, (2) calculating an offset (a difference value) to the next number, and (3) checking the range of the offsets. For example, if a sequence of numbers is 2, 5, 4, 6, 8, these numbers may be stored directly in the memory. Further, by calculating the offset between each number, the sequence of number may be converted to a sequence of 2, 3, −1, 2, 2. If there is still a next number in the sequence, the step (2) may be performed again. Furthermore, after an offset or all the offsets is/are calculated, the value/range of the offset(s) may be checked that if an offset is within a predetermined range. For example, if an offset is within −127 to 127, 127 may be added to the offset to store the result as an unsigned byte (i.e., remove the sign bit). The purpose is to remove the negative sign. That is, in the 3D model processing method 900, in response to a different value between the first spatial value and the second spatial value being negative, a compensation value may be added to ensure that the different value between the first spatial value and the second spatial value being positive. Therefore, the sequence of number may be represented as unsigned byte, thereby reducing one bit (i.e., representing the sign) when storing data. On the other hand, if the offset is outside of the predetermined range (e.g., −127 to 127), a binary value of 255 may be stored, to indicate that the number will be stored next in full precision. However, this disclosure is not limited thereto.

It is noted that, the strategy for the positional data makes use of the fact that geometry data is often stored very localized. Vertex positions are usually close to their neighbors, so most of the time only the offsets are necessary to be stored. If data were provided that would constantly jump from MIN to MAX values, then the compression would be worse than storing the numbers uncompressed. However, in most of the cases, the compression ratio is expected to be good, thereby decreasing the size of file of the 3D model.

In one embodiment, the vertex indices of triangles of a 3D model may be often stored in order. Fox example, a first triangle may have vertex indices V1, V2, V3, a second triangle may have vertex indices V4, V5, V6, and so on. To take advantage of this, the system may only store a single bit to indicate that an index of the next vertex is also an index of the next consecutive index. Specifically, as shown in table 2 below, if a triangle T1 with vertices V1, V2, V3 has been stored, an index of a current vertex may be V3 (i.e., the latest stored vertex) and an index of a next vertex of a next triangle T2 may be V4. Then, a single bit of the index of the next vertex (i.e., V4) may be stored as 0 to indicate that the next index is the next consecutive index (i.e., 4 is right after 3). Therefore, instead of storing the whole data of the next vertex, this may save space because it only requires a single bit to store the next index of the next vertex.

TABLE 2

| Triangle | Vertices of Triangle | Three Previously Used Vertices | Value Stored |
|---|---|---|---|
| T1 | V1, V2, V3 | (V1, V2, V3) | 0, 0, 0 |
| T2 | V4, V2, V6 | (V1, V2, V3), (V2, V3, V4), (V3, V4, V2) | 0, 100, 111 V6 |

On the other hand, if an index of a next vertex is not the next consecutive index but it is one of the previous three used indices, then the system may store a 1 as a first bit of the index of the next vertex. Then, the next two bits of the next index of the vertex may be used to store the three previously used indices. That is, instead of a single bit, three bits may be used for representing the index of the vertex. For example, if the current index of a vertex is V4, and the next index of a vertex is V1 (i.e., the first one of the previously used index), then the index of the next vertex may be stored as 100. Similarly, if the next index of a vertex is V2 (i.e., the second one of the previously used index) or V3 (i.e., the third one of the previously used index), then the index of the next vertex may be stored as 101 or 110. However, this disclosure is not limited thereto. In addition, if the index of the next vertex is not one of the previous three used indices, the index of the next vertex may be stored as 111 and the actual index may be stored as the following bit(s) of the index of the next vertex. For example, the third vertex of the triangle T2 may be stored as 111 and V6.

Therefore, the triangle data may be stored in an efficient way, because only a single bit is stored to indicate if the next index is the next consecutive index. Further, while the next index is not the next consecutive index, but it is one of the previous three used indices, only three bits are stored. In this manner, the next index may be stored with a relatively small amount of space, thereby reducing the loading time of the 3D model.

In one embodiment, other than the position data and triangle data, a normal may be a vector that describes the angle and curvature of the mesh at each vertex position. To improve a compression ratio, the normals may be encoded or compressed utilizing similar algorithm, while the details are not redundantly described seriatim herein.

Based on the above, the compression algorithm 1010 may include different strategies for different components in the 3D model. Therefore, by performing the compression algorithm 1010 on an original data of the 3D model, a compressed data of the 3D model may be generated and the size of the compressed data may be smaller than the original data, thereby decreasing the loading time of the 3D model.

Figure 11:
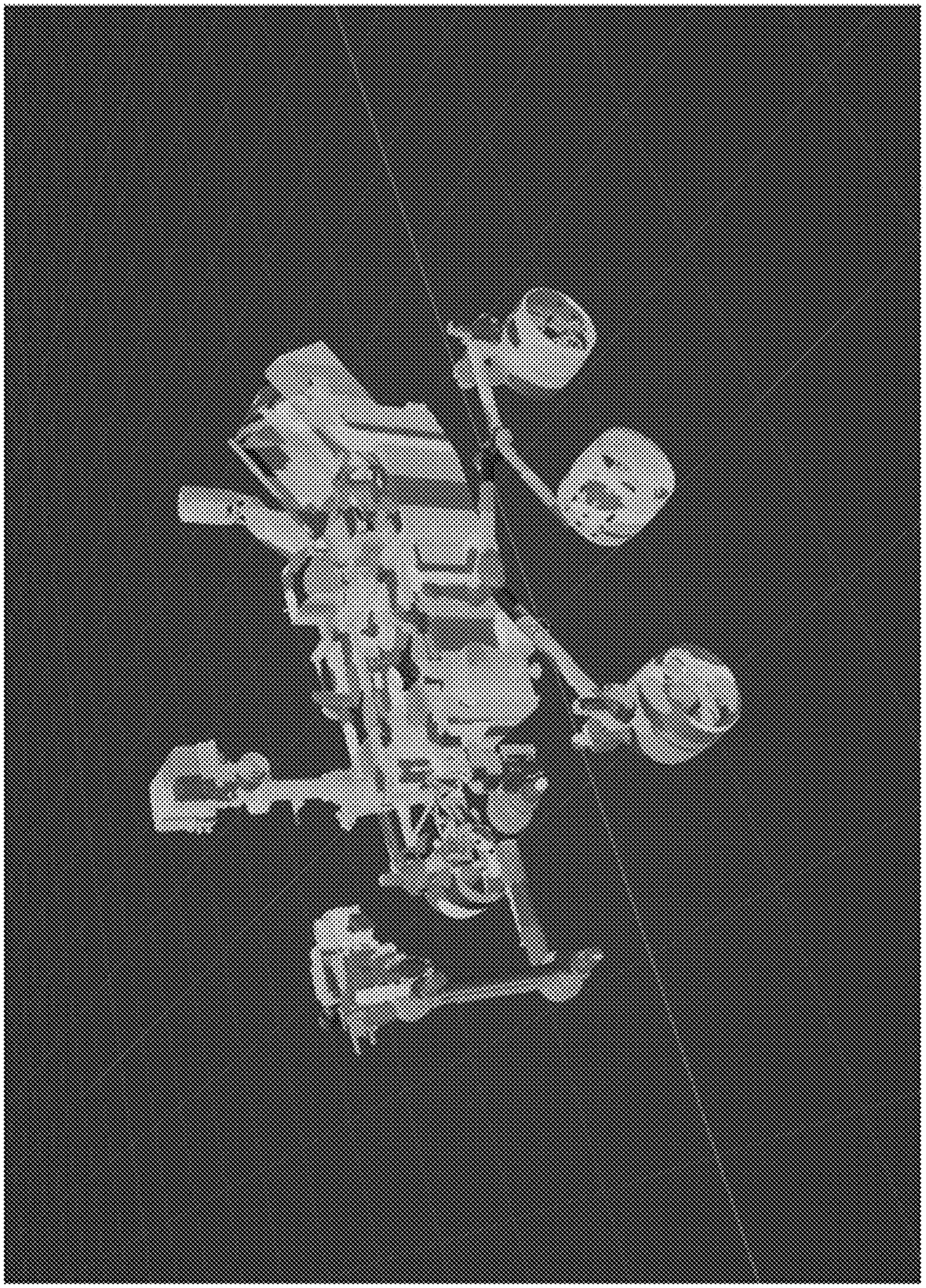
FIG. 11 is a schematic diagram of a compressing scenario of a 3D model according to an embodiment of the disclosure.

FIG. 11 is a schematic diagram of a compressing scenario of a 3D model according to an embodiment of the disclosure. With reference to FIG. 11, a compressing scenario 1100 depicts how triangles of a 3D model may be grouped together to reduce the size of the 3D model.

In one embodiment, to improve the predictability (i.e., increasing the compression ratio) of the mesh data, the mesh of the 3D model may be subdivided into groups of triangles. That is, in the 3D model processing method 900, before the step S910, the meshes of the 3D model nearby may be grouped into a plurality of groups of triangles. It is noted that, when making the groups, the triangles may be chosen based on being nearby each other and share as many vertices and edges as possible. For example, as shown in FIG. 11, the triangles nearby (e.g., the triangles share an edge or the triangles are adjacent) are grouped together to reduce amount of the data. This helps to improve the compression ratio because the data for each group is more similar than the data for the entire mesh.

Further, once the groups of triangles have been formed, the compressing algorithm 1010 may be applied to the 3D model to further compress the data for each group of triangles individually. For example, the positional data, the triangle indices, the vertex indices of the triangles, or the normals may be compressed to decrease the size of the file of the 3D model, thereby decreasing the loading time of the 3D model and achieve streaming the 3D model in real time.

In summary, according to the 3D model processing system 100, the 3D model processing method 200, the 3D model processing method 700, and the 3D model processing method 900, since the 3D model is created, compressed, or loaded while a loading time from a user end is considered, the 3D model may be streamed to the user device in real time, thereby increasing the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A 3D model processing system, comprising:

a storage circuit, storing a program code; and a processor, coupled to the storage circuit and accessing the program code to execute:

obtaining a first original spatial value and a second original spatial value of a 3D model, wherein the first original spatial value is a first vertex index of a triangle of the 3D model and the second original spatial value is a second vertex index of the triangle of the 3D model;

obtaining a difference value between the first original spatial value and the second original spatial value; and generating a compressed spatial value corresponding to the second original spatial value based on the difference value, wherein in response to the second vertex index being consecutive with the first vertex index, generating the compressed spatial value by replacing the second original spatial value with a single binary bit and storing the single binary bit, wherein the single binary bit is configured to indicate that whether the second vertex index is consecutive with the first vertex index, and in response to the second vertex index not being consecutive with the first vertex index and being one of previous three used indices, generating the compressed spatial value by replacing the second original spatial value with three binary bits, wherein a first bit of the three binary bits is configured to indicate that the second vertex index is not consecutive with the first vertex index and a second bit and a third bit of the three binary bits are configured to indicate indices of the one of the previous three used indices.

2. The 3D model processing system according to claim 1, wherein the first original spatial value is a first coordinate of the 3D model and the second original spatial value is a second coordinate of the 3D model.

3. The 3D model processing system according to claim 2, wherein the processor further executes:

generating the compressed spatial value by replacing the second original spatial value with the difference value.

4. The 3D model processing system according to claim 1, wherein the processor further executes:

in response to the second vertex index not being consecutive with the first vertex index and not being one of previous three used indices, generating the compressed spatial value by storing an actual index of the second original spatial value.

5. The 3D model processing system according to claim 1, wherein the processor further executes:

in response to the difference value being negative, adding a compensation value to ensure that the difference value being positive.

6. The 3D model processing system according to claim 1, wherein the processor further executes:

grouping meshes of the 3D model nearby into a plurality of groups of triangles.

7. A 3D model processing method, comprising:

obtaining a first original spatial value and a second original spatial value of a 3D model, wherein the first original spatial value is a first vertex index of a triangle of the 3D model and the second original spatial value is a second vertex index of the triangle of the 3D model;

obtaining a difference value between the first original spatial value and the second original spatial value; and generating a compressed spatial value corresponding to the second original spatial value based on the difference value, wherein in response to the second vertex index being consecutive with the first vertex index, generating the compressed spatial value by replacing the second original spatial value with a single binary bit and storing the single binary bit, wherein the single binary bit is configured to indicate that whether the second vertex index is consecutive with the first vertex index, and in response to the second vertex index not being consecutive with the first vertex index and being one of previous three used indices, generating the compressed spatial value by replacing the second original spatial value with three binary bits, wherein a first bit of the three binary bits is configured to indicate that the second vertex index is not consecutive with the first vertex index and a second bit and a third bit of the three binary bits are configured to indicate indices of the one of the previous three used indices.

8. The 3D model processing method according to claim 7, wherein the first original spatial value is a first coordinate of the 3D model and the second original spatial value is a second coordinate of the 3D model.

9. The 3D model processing method according to claim 8, further comprising:

generating the compressed spatial value by replacing the second original spatial value with the difference value.

10. The 3D model processing method according to claim 8, further comprising:

in response to the second vertex index not being consecutive with the first vertex index and not being one of previous three used indices, generating the compressed spatial value by storing an actual index of the second original spatial value.

11. The 3D model processing method according to claim 7, further comprising:

in response to the difference value being negative, adding a compensation value to ensure that the difference value being positive.

12. The 3D model processing method according to claim 7, further comprising:

grouping meshes of the 3D model nearby into a plurality of groups of triangles.

13. The 3D model processing method according to claim 7, wherein the first original spatial value is a minimum value of a sequence of numbers and the second original spatial value is a maximum value of the sequence of numbers, and the 3D model processing method further comprises:

determining a number of bits of precision based on the difference value.

14. A non-transitory storage circuit, storing a program code and the program code is configured to cause a processor to execute:

obtaining a first original spatial value and a second original spatial value of a 3D model, wherein the first original spatial value is a first vertex index of a triangle of the 3D model and the second original spatial value is a second vertex index of the triangle of the 3D model;

obtaining a difference value between the first original spatial value and the second original spatial value; and generating a compressed spatial value corresponding to the second original spatial value based on the difference value, wherein in response to the second vertex index being consecutive with the first vertex index, generating the compressed spatial value by replacing the second original spatial value with a single binary bit and storing the single binary bit, wherein the single binary bit is configured to indicate that whether the second vertex index is consecutive with the first vertex index, and in response to the second vertex index not being consecutive with the first vertex index and being one of previous three used indices, generating the compressed spatial value by replacing the second original spatial value with three binary bits, wherein a first bit of the three binary bits is configured to indicate that the second vertex index is not consecutive with the first vertex index and a second bit and a third bit of the three binary bits are configured to indicate indices of the one of the previous three used indices.

* * * * *